United States Patent
Herring, Jr. et al.

[11] Patent Number: 5,632,413
[45] Date of Patent: May 27, 1997

[54] ADHESIVE BONDING APPARATUS AND METHOD USING NON-COMPRESSIBLE BEADS

[75] Inventors: James M. Herring, Jr., Rochester Hills; Bruce N. Greve, Davisburg, both of Mich.

[73] Assignee: The Budd Company, Troy, Mich.

[21] Appl. No.: 488,044

[22] Filed: Jun. 7, 1995

Related U.S. Application Data

[62] Division of Ser. No. 195,746, Feb. 14, 1994, Pat. No. 5,470,416, which is a continuation of Ser. No. 869,649, Apr. 16, 1992, abandoned.

[51] Int. Cl.⁶ .................................................. G01F 11/00
[52] U.S. Cl. ................... 222/1; 222/1.35; 222/145.6; 222/146.6; 222/386; 222/459; 222/509
[58] Field of Search .................... 222/1, 135, 145.5, 222/145.6, 146.6, 386, 459, 509

[56] References Cited

U.S. PATENT DOCUMENTS

| | | | |
|---|---|---|---|
| 1,960,042 | 5/1934 | Andrus | 137/75 |
| 2,821,890 | 2/1958 | Wilson | 118/310 |
| 3,279,972 | 10/1966 | Thassy | 161/53 |
| 3,551,232 | 12/1970 | Thompson | 156/330 |
| 3,554,449 | 1/1971 | Curie | 222/146 |
| 3,692,341 | 9/1972 | Brown et al. | 287/189.36 F |
| 3,700,514 | 10/1972 | Zito, Jr. | 156/280 |
| 3,770,546 | 11/1973 | Childress et al. | 156/285 |
| 3,773,098 | 11/1973 | Rock | 164/79 |
| 3,828,515 | 8/1974 | Galgoczy | 52/758 F |
| 3,909,918 | 10/1975 | Takizawa et al. | 29/509 |
| 4,008,845 | 2/1977 | Bleckmann | 228/136 |
| 4,131,980 | 1/1979 | Zinnbauer | 29/463 |
| 4,353,951 | 10/1982 | Yukitoshi et al. | 428/198 |
| 4,467,071 | 8/1984 | Dawdy | 525/112 |
| 4,548,920 | 10/1985 | Drake | 366/177 |
| 4,560,607 | 12/1985 | Summer | 428/141 |
| 4,749,833 | 6/1988 | Novorsky et al. | 156/272.4 X |
| 4,769,419 | 9/1988 | Dawdy | 525/111 |
| 4,770,585 | 9/1988 | Astl | 411/446 |
| 4,801,008 | 1/1989 | Rich | 206/219 |
| 4,866,108 | 9/1989 | Vachon et al. | 523/428 |
| 4,916,284 | 4/1990 | Petrick | 219/121.64 |
| 4,938,381 | 7/1990 | Mandeville et al. | 222/135 X |

(List continued on next page.)

FOREIGN PATENT DOCUMENTS

| | | | |
|---|---|---|---|
| 0289632 | 9/1988 | European Pat. Off. | |
| 49-30259 | 8/1974 | Japan | 156/276 |
| 135430 | 6/1986 | Japan | 156/216 |

OTHER PUBLICATIONS

Elber, "Putting adhesives in their place", *Plastics Design Forum*, Sep./Oct. 1993, pp. 40–44.
Berins, *SPI Plastics Engineering Handbook*, Society of the Plastics Industry, Inc., 18 pages, 1991.
Clark, "Tapes and Structural Bonding Reduce Radar Unit Cost", *Adhesives Age*, Jun. 1991, pp. 28–34.
"Metal to Metal Overlap Shear Strength Test for Automotive Type Adhesives", SAE J1523, Jun. 1985.

*Primary Examiner*—Joseph Kaufman
*Attorney, Agent, or Firm*—Harness, Dickey & Pierce, P.L.C.

[57] ABSTRACT

A method for adhesively joining two members includes the steps of mixing non-compressible beads with an adhesive, applying the resulting mixture to one of the members and hemming one member over the other in overlapping relationship. Apparatus for performing this method includes a container for containing a mixture of an adhesive and a plurality of non-compressible beads, an applicator for applying the mixture to one of the members, and hemming apparatus for hemming one member over the other in overlapping relationship. A metering device for dispensing adhesive fluid is constructed with a dispensing rod having a cooling apparatus for facilitating operation of the metering device. The present invention finds particular utility in bonding together the inner and outer panels of an automotive door assembly.

17 Claims, 5 Drawing Sheets

U.S. PATENT DOCUMENTS

| | | | |
|---|---|---|---|
| 4,971,859 | 11/1990 | Kimura et al. | 428/325 |
| 5,008,304 | 4/1991 | Kmentt | 523/118 |
| 5,026,188 | 6/1991 | Capodieci | 222/146.6 X |
| 5,080,493 | 1/1992 | McKown et al. | 222/459 X |
| 5,237,734 | 8/1993 | Polon | 29/513 |
| 5,332,125 | 7/1994 | Schmitkons et al. | 222/145.6 X |
| 5,487,803 | 1/1996 | Sweeney | 156/91 |

ADHESIVE BONDING APPARATUS AND METHOD USING NON-COMPRESSIBLE BEADS

This application is a divisional requirement of U.S. Ser. No. 08/195,746 filed Feb. 14, 1994, now U.S. Pat. No. 5,470,416 issued Nov. 28, 1995, which is a continuation application of U.S. Ser. No. 07/869,649 filed Apr. 16, 1992, now abandoned.

BACKGROUND OF THE INVENTION

1. Technical Field

This invention relates to adhesively bonding at least two members and, more particularly, to joining at least two members with a mixture of an adhesive and non-compressible beads.

2. Discussion

Figure 1:
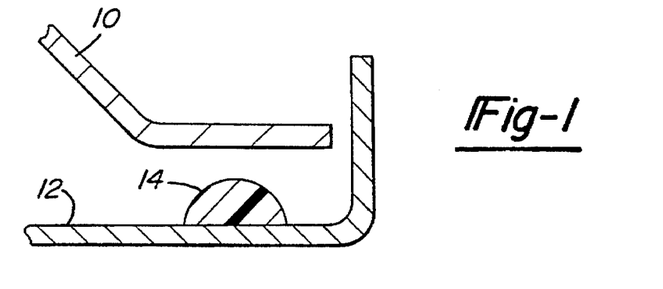
FIGS. 1 through 4 are sectional views showing steps in making a hemmed adhesive joint which illustrate the problem solved by the present invention.
Figure 2:
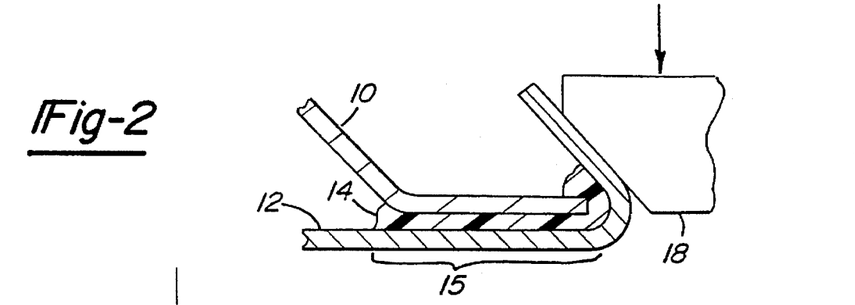
Figure 3:
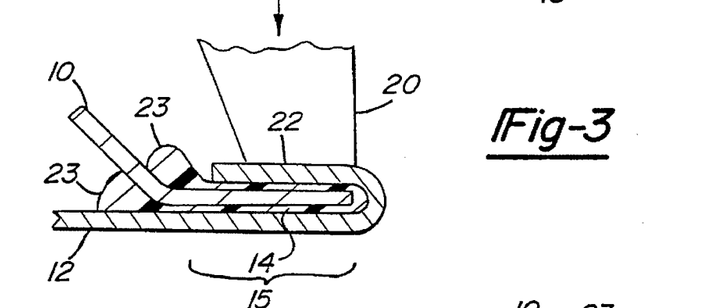

FIGS. 1 through 4 show a method of making a hemmed joint for inner and outer sheet metal door panels. FIG. 1 shows a first member 10, a second member 12, and an amount of adhesive 14 which has been applied to second member 12. In FIG. 2, first member 10 has been placed into proximity with second member 12, and first and second members 10, 12 have been squeezed together. The area where first and second members 10,12 overlap defines an adhesive joint 15. Adhesive 14 has spread throughout the area of joint 15. FIG. 2 further shows a hemming die 18 which is pressed downward to bend a portion of second member 12 into overlapping relationship with first member 10. In FIG. 3, a second hemming die 20 is shown completing the hem by further folding down a portion of second member 12 to overlap first member 10, such that a hemmed portion 22 of second member 12 is parallel with the portions of first and second members 10, 12 in the area of joint 15. Quite often, adhesive 23 is squeezed out of the area of joint 15 as a result of completion of the hemming operation. This squeezed-out adhesive 23 is unsightly and often requires removal in an additional manufacturing step where aesthetics is important, such as in the making of an automobile door where inner and outer panels are hemmed together.

Figures 4, 5:
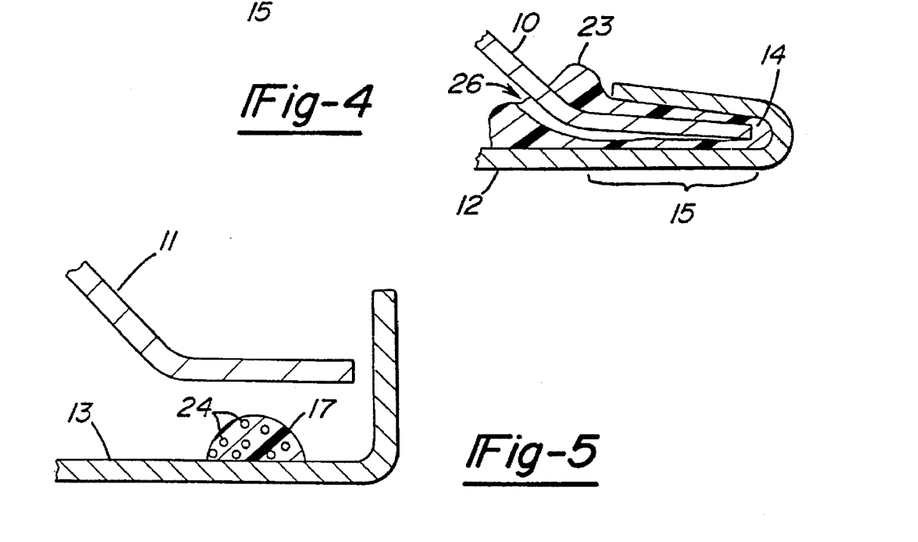
FIGS. 5 through 8 are sectional views of a hemmed adhesive joint formed according to the principles of the present invention.

Following formation of the hemmed joint 15, the first and second members 10,12 tend to elastically relax and "spring back" toward their original positions. FIG. 4 shows joint 15 subsequent to this "spring back" phenomenon, which tends to create an air-filled gap 26 between adhesive material 14 and first member 10. Air-filled gap 26 results because adhesive 14 has been squeezed out of joint 15 and an insufficient amount remains to fill the void created by the "spring back" of first and second members 10, 12. This air-filled gap 26 reduces the area of joint 15, resulting in a weakened joint.

SUMMARY OF THE INVENTION

The present invention provides a method and apparatus for adhesively joining at least two members in which a plurality of non-compressible beads are mixed with the adhesive, and one of the members is folded into overlapping relationship with the other in a hemming operation. The beads may be added to the adhesive in a preselected substantially uniform concentration. The apparatus for performing this method includes a container for containing a mixture of an adhesive and a plurality of non-compressible beads. An application gun applies this mixture to at least one of the members to be joined. A pump is employed for pumping the bead and adhesive mixture from the container through the application gun onto at least one of the members. A hemmer then hems one member into overlapping relationship with another.

The present invention further provides a metering device having an improved displacement rod which includes a cooling means for cooling the rod and preventing the adhesive fluid from hardening, thus facilitating insertion of the displacement rod into the metering chamber.

BRIEF DESCRIPTION OF THE DRAWINGS

The various advantages and features will become apparent from the following description and claims in conjunction with the accompanying drawings:

DETAILED DESCRIPTION OF THE PREFERRED EMBODIMENT

The following description of the preferred embodiments is merely exemplary in nature and is in no way intended to limit the invention or its application or uses.

Figure 6:
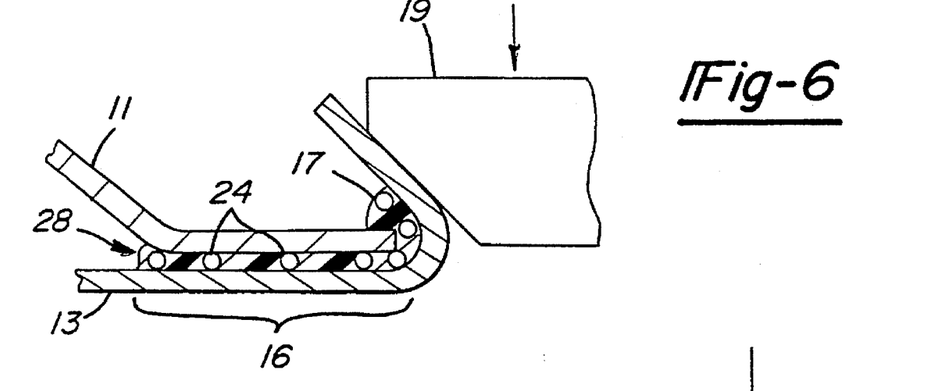
Figure 7:
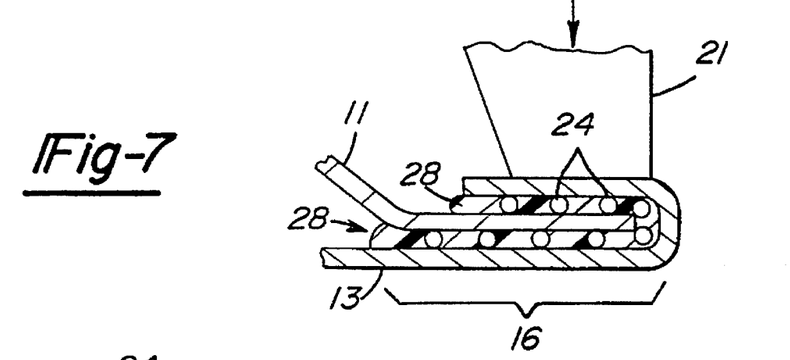

Referring to the drawings, in which like reference numerals refer to similar features, FIGS. 5 through 8 show a method of joining a first and second member 11, 13 according to the present invention. By way of a non-limiting example, the first and second members 11, 13 are edges of inner and outer sheet metal automobile door panels. FIG. 5 shows first member 11, second member 13, and an amount of adhesive 17 which has been mixed with a plurality of non-compressible beads 24, and this mixture has been applied to second member 13. In FIG. 6, first and second members 11, 13 have been squeezed together to form a joint 16, which has caused the adhesive 17 and bead 24 mixture to spread throughout the area of joint 16. The non-compressible beads 24 maintain a specific distance 28 between the portions of first and second members 11, 13 in the area of joint 16. Hemming die 19 is shown folding a portion of second member 13 over a portion of first member 11. FIG. 7 shows the joint 16 following completion of the hemming operation by second hemming die 21. The non-compressible beads 24 prevent an excess amount of adhesive 17 from being squeezed out of the area of joint 16 and maintain the predetermined distance 28 between first and second members 11, 13 throughout all the areas of joint 16. The joint 16 does not require additional processing to remove the unacceptable squeezed-out adhesive as in the aforementioned prior art technique.

Figure 8:
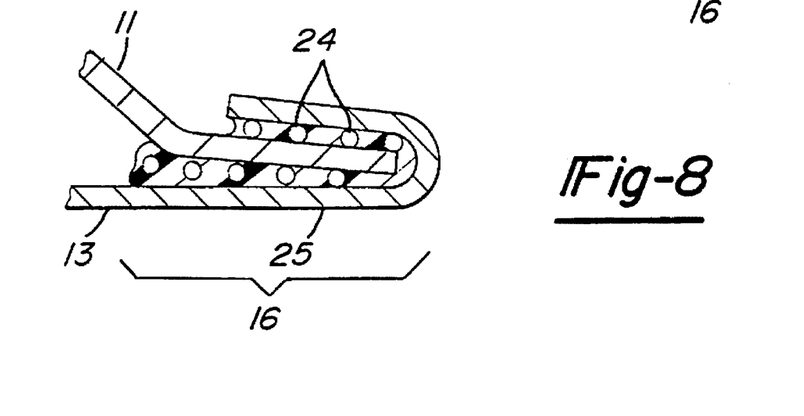

FIG. 8 shows joint 16 following plastic relaxation of first and second members 11, 13 toward their original positions. Because beads 24 ensure that most of adhesive 17 remains in the area of joint 16, the joint 16 created by a method of the present invention tends to maintain its integrity and prevent creation of an air-filled gap in the area of joint 16, resulting in a stronger bond between first and second members 11, 13.

The beads 24 need not be spherical, although a spherical shape is preferable. Beads 24 are preferably made of glass and should be mixed with adhesive 17 in a concentration which is sufficiently high to prevent beads 24 from becoming partially embedded in the surfaces of the members 11,13 during the hemming operation, and should not show "read through" to the outer panel surface 25. "Read through" is defined as an imperfect, uneven or bumpy outer surface 25 of second member 13. The concentration of beads 24 in adhesive 14 should also be sufficiently low to provide a strong joint and not to damage apparatus for handling and pumping the bead and adhesive mixture. The adhesive in mixture 17 is preferably a blend of a two component acrylic/epoxy adhesive, such as VERSILOK 252 and VERSILOK 254 available from Lord Corporation. The concentration of beads 24 in the mixture range from about 5% to about 20% of the total weight of the mixture and about 10% by weight is preferable, which results in approximately 1000 beads per square inch of the adhesive mixture in the final joint.

The beads 24 should preferably be made having a diameter sufficiently low to provide a strong joint and sufficiently high such that the beads 24 are effective spacers, without showing "read through" to the outer panel. Acceptable diameters for the beads 24 range from 0.003 to 0.030 inches, and 0.010 inches is preferable.

Figure 9:
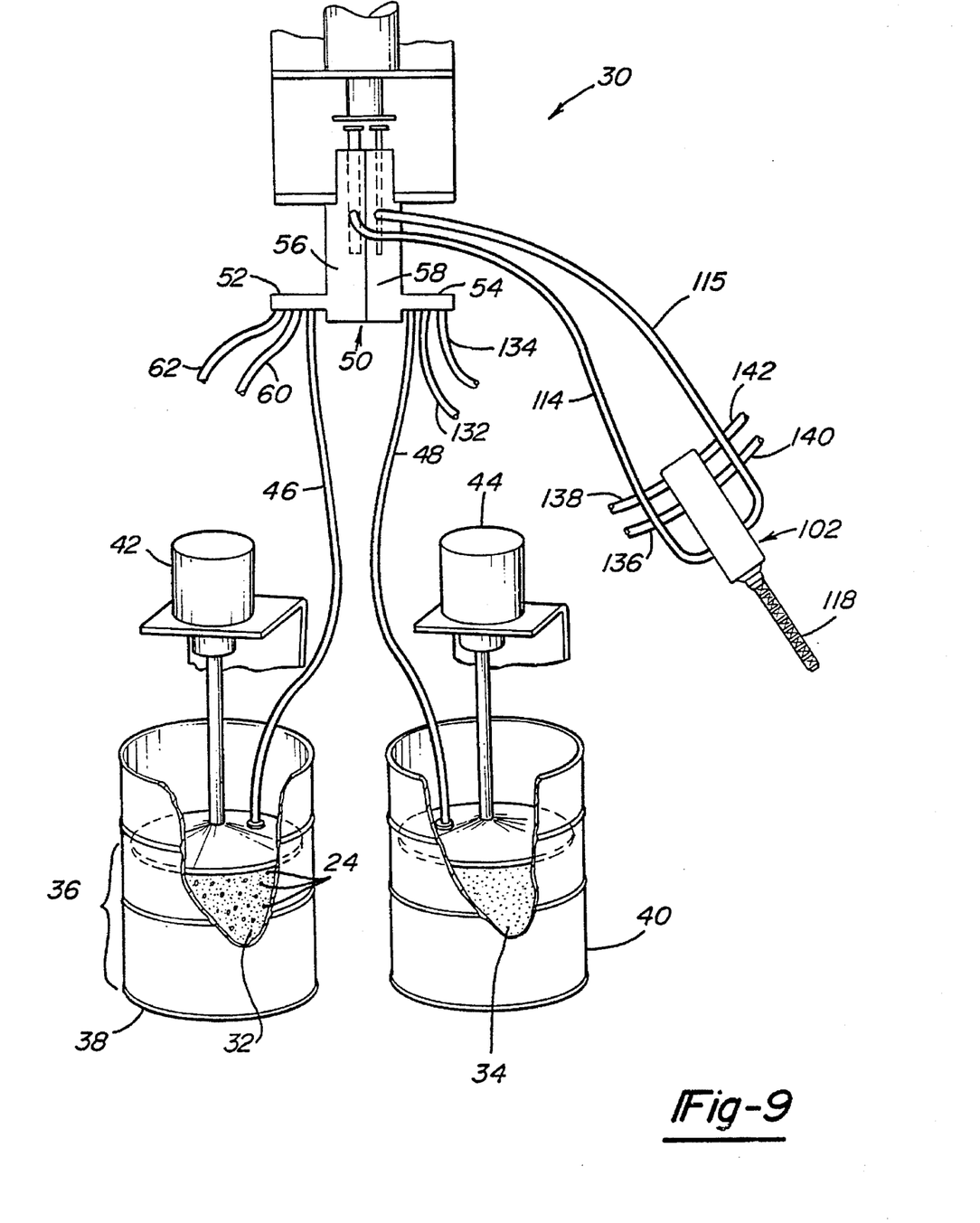
FIG. 9 is a perspective and partial cut-away view of an apparatus according to the principles of the present invention.

FIG. 9 depicts apparatus 30 for forming an adhesive bond according to the method of the present invention. In the embodiment of FIG. 9, the adhesive is a two part adhesive consisting of a first component 32 and a second component 34. The present invention may also be practiced with a one component adhesive. The proper amount of beads 24 are mixed in container 38 with the first component 32 to achieve the aforementioned concentration. The first component 32, in this particular example, is Versilok 252 which contains acrylic and an epoxy curative. (Second component 34 contains epoxy resin and an acrylic curative). Beads 24 are mixed with first component 32 because it is more thixotropic than second component 34, thereby keeping the beads in suspension for longer periods of time. It is the understanding of the inventors that a pre-mixed bead/adhesive mixture is now available from Lord Corporation as VERSILOK 253. A second container 40 substantially similar to first container 38 contains second component 34. First and second containers 38, 40 are preferably 55 gallon drums, as used in the art. First and second pumps 42,44 pump the first mixture 36 of first component 32 and beads 34 as well as the second component 34 from first and second containers 38, 40 respectively. First mixture 36 is pumped through a first supply tube 46 into a first metering chamber 56 of a metering device 50 through a first inlet valve 52. Second component 34 is pumped through a second supply tube 48 into a second metering chamber 58 of metering device 50 through a second inlet valve 54.

A first and second valve member (not shown) are operated by compressed air tubes 60, 62 and 132, 134. The operation of first and second valve 52, 54 by compressed air tubes 60, 62 and 132, 134 respectively will be explained below. First mixture 36 and second component 34 are then displaced from first and second metering chambers 56, 58 through exit valves (not shown) identical to inlet valves 52, 54 and then into application tubes 114, 115 into an adhesive application gun 102 which is shown in greater detail in FIG. 12. Adhesive gun 102 has left and right halves (not shown) each containing a valve (not shown) operated by compressed air tubes 136, 138 and 140, 142. Adhesive materials exit adhesive gun 102 and are mixed in an elongated mixing nozzle 118 and the resulting mixture is applied to a member 11, 13 to be adhesively joined.

Figure 10:
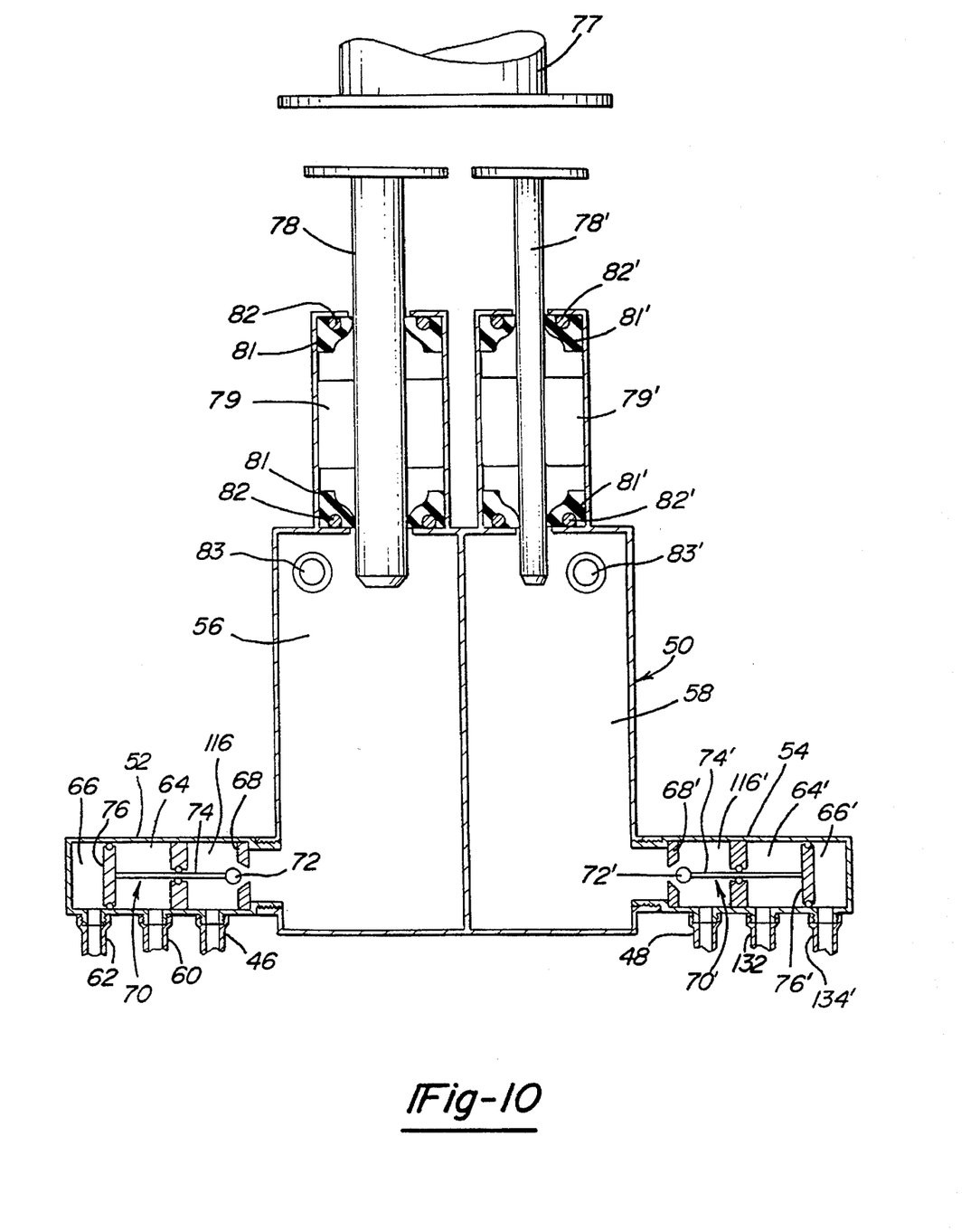
FIG. 10 is a cut-away view of a metering device according to the principles of the present invention.

Adhesive materials consisting of first mixture 36 and second component 34 flow through first and second valves 52, 54 into a metering device 50 which is shown in greater detail in FIG. 10. Metering device 50 defines a first and a second metering chamber 56, 58. The first mixture 36 is pumped into first metering chamber 56 and second component 34 is pumped into second metering chamber 58, with the exit valves being closed. The force of the fluids being pumped into the metering chambers causes rods 78, 78' to be pushed upwardly. First and second valves 52, 54 then close, preventing flow of first mixture 36 or second component 34.

First and second valves 52, 54 are constructed substantially similarly having a valve seat 68, 68' and a valve member 70, 70' consisting of a spherical valve plug 72, 72' connected to a longitudinally extending valve shaft 74, 74' which is in turn connected to a plate-shaped piston member 76, 76'. Inlet tubes 46, 48 are connected to first and second valve 52, 54 and allow fluid to enter valve chambers 116, 116'. Compressed air hoses 60, 62 and 132, 134 are also connected to first and second valves 52, 54.

Valve members 70, 70' are moved between open and closed positions by creating a pressure differential across pistons 76, 76'. To close the valve, the pressure in valve opening chamber 64, 64' is alleviated, and compressed air is forced into the closing chamber 66, 66' by closing compressed air tube 62, 134 to increase the pressure therein. The resulting difference in pressure across piston 76, 76' causes the valve shaft 74, 74' to move axially and press spherical valve plug 72, 72' into place against the valve seat 68, 68'. To open valve, the pressures in opening and closing chambers 64, 66 and 64', 66' are reversed. When first and second valves 52, 54 are open, first mixture 36 and second component 34 which are under pressure due to first and second pumps 42, 44 enter first and second metering chambers 56, 58 through valve chambers 116, 116' and from inlet tubes 46, 48.

Valve plug 72, 72' must make full circular contact with valve seat 68, 68' to completely shut off flow. As a result, valve plug 72 and seat 68 are made of a material sufficiently strong to resist damage by beads 24, or strong enough to repeatedly crush any glass beads 24 without damage. As a result, valve plug 72 and seat 68 are preferably constructed of tungsten carbide or hardened steel. The same is true of the exit valve (not shown) which is connected to chamber 56.

Metering device 50 further has a first and second displacement rod 78, 78' which are assembled through a bearing 79, 79' and opposing seals 81, 81' formed with O-rings 82, 82' to retain them in place. Displacement rod 78 is preferably made of hardened steel to prevent damage by the beads. Displacement rods 78, 78' are adapted to be forced into first and second chamber 56, 58 respectively, and thereby to displace first mixture 36 as well as second component 34 from first and second chamber 56, 58. As a result, first mixture 36 and second component 34 are forced by displacement rods 78, 78' through outlets 83, 83' and through a first and second application tube 114, 115 into an application gun 102 and a mixing nozzle 118 which combines first mixture 36 and second component 34 into a second mixture of component 32, second component 34, and beads 24. Gun 102 is used to apply second mixture to a member 11, 13 to form an adhesive joint 16 according to the present invention. Rods 78, 78' have different but constant cross-sections throughout their longitudinal lengths. Accordingly, rods 78, 78' force a preselected volume flow ratio of first mixture 36 and second component 34 out of outlets 83 and 83', respectively, in the proper proportion substantially equivalent to the cross-sectional ratio of the diameter of rod 78 to rod 78' when they are moved downwardly by power head 77.

Figure 11:
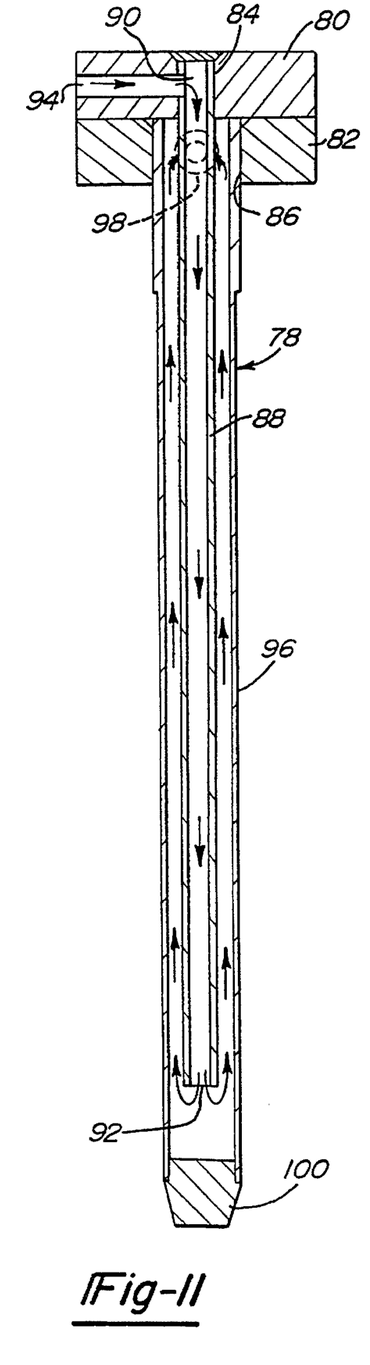
FIG. 11 is a cut-away view of a displacement rod according to the principles of the present invention.

FIG. 11 depicts displacement rod 78 as having a cooling system to prevent partial polymerization or hardening of the adhesive fluid located near the juncture of the rod 78 and housing of metering device 50 at the seal 81. The displacement rod 78 is constructed of an upper and lower head block 80, 82 which are each formed with vertical bores 84, 86. The bore 84 formed in upper head block 80 has a smaller diameter than bore 86 formed in lower head block 82. Bore 84 formed in upper head block 80 carries the upper end of an inner flow tube 88 which has an inlet 90 and an outlet 92. Upper head block 80 is formed with a horizontally extending inlet passage 94 which opens into the inlet 90 of inner flow tube 88. Bore 86 formed in lower head block 82 carries the upper end of a displacement tube 96 which has an outlet 98 at one end and a cap 100 at the other end which allows no fluid communication. Inner flow tube 88 extends throughout a majority of the length of displacement tube 78.

In operation of the displacement rod 78 cooling system, cooling fluid such as water enters and flows through inlet passage 94 to inlet 90 of inner flow tube 88 as shown by the arrows in FIG. 11. Coolant fluid flows through inner flow tube 88 and exits through outlet 92. Coolant fluid undergoes a flow reversal and proceeds upward through a gap 101 formed between the outer surface of inner flow tube 88 and the inner surface of displacement tube 96 and exits displacement rod 78 through outlet 98.

Figure 12:
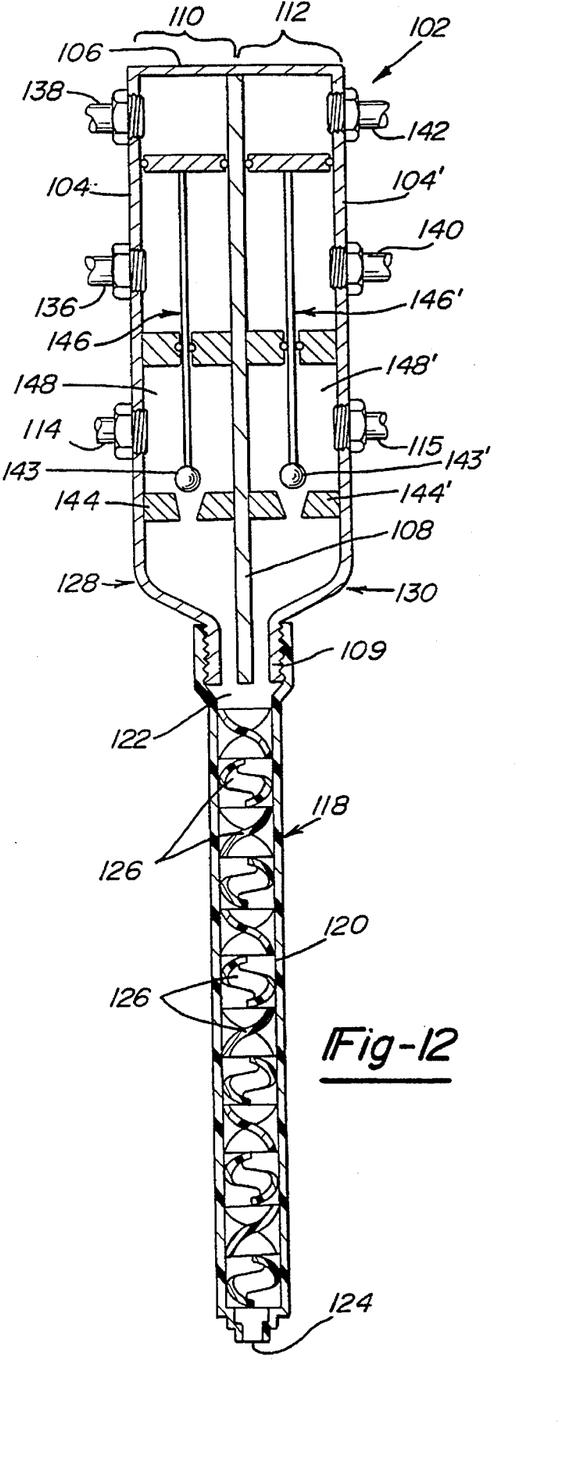
FIG. 12 is a cut-away view of an adhesive application gun according to the principles of the present invention.

FIG. 12 shows the adhesive application gun 102. Adhesive gun 102 is formed with side walls 104, 104', a rear panel 106, a central longitudinally extending partition 108, and a front nozzle portion 109. Central partition 108 defines left and right symmetrical halves 110, 112 of adhesive gun 102. Each half 110, 112 of adhesive gun 102 includes similar valves 128, 130 constructed substantially similar to first and second inlet valves 52, 54 and have a valve seat 144, 144', valve plug 143, 143' valve member 146, 146', and application inlet tubes 114, 115 which allow fluid to enter valve chambers 148, 148'. Valve seat 144 and plug 143 are made of tungsten carbide or other hardened materials to reduce bead damage. Compressed air hoses 136, 138 and 140, 142 operate valves 128, 130 as described above. When the valves 128, 130 are open, adhesive fluid under pressure due to displacement rods 78, 78' enters valve chambers 148, 148' through fluid inlet hoses 114, 115 and proceeds out of adhesive gun 102 through nozzle 109.

An elongated mixing nozzle 118 is affixed to and extends from nozzle 109 formed on adhesive gun 102. Mixing nozzle 118 is formed as an elongated tube 120 having an inlet 122 and an outlet 124 and contains a plurality of helical mixing elements 126. The adjacent ends of successive helical elements 126 should not be aligned so that the adhesive fluids entering left and right sides 110, 112 of adhesive gun 102 are thoroughly mixed. The resulting mixture exits mixing nozzle 118 through outlet 124. Because first component 32 and second component 34 are mixed within mixing nozzle 118, mixing nozzle 118 should be unscrewed and flushed or purged of old adhesive materials approximately every 15 to 20 minutes to prevent polymerization.

Hemming apparatus as known in the art is used to fold one member 10 into overlapping relationship with a second member 12. Hemming means preferably should apply local pressures in the range of 2000 to 10,000 pounds per square inch, but should be at least 1000 pounds per square inch. A typical hemming machine is commercially available from E. R. St. Dennis & Sons Ltd. of Old Castle, Ontario, Canada.

It should be understood that various modifications of the preferred embodiments of the present invention will become apparent to those skilled in the art after a study of the specification, drawings, and the following claims.

What is claimed is:

1. A metering device for dispensing an adhesive fluid comprising:
   a) a housing having an outlet and defining a metering chamber, said chamber being substantially filled with said adhesive;
   b) a displacement member adapted to be forced into said chamber and thereby to displace said adhesive and force said adhesive out of said chamber through said outlet; and
   c) heat transfer means for cooling said displacement member to prevent said adhesive from hardening, thereby to facilitate displacement of said adhesive by said displacement member.

2. The metering device as set forth in claim 1, wherein said displacement member has a constant cross-section, such that the volume rate of displacement equals the cross-sectional area of said displacement member multiplied by the rate of insertion of said displacement member into said metering chamber.

3. The metering device as set forth in claim 2, which further comprises an inlet to said housing, and valve means connected to said inlet operative to allow entry of said adhesive through said inlet into said chamber and subsequently to prevent exit of said adhesive through said inlet from said chamber during insertion of said displacement member into said metering chamber.

4. The metering device as set forth in claim 3, said displacement member having a major axis and being formed with a recess extending along said major axis, said recess being adapted to allow flow of a cooling fluid within said displacement member so as to cool said displacement member.

5. The metering device as set forth in claim 3, wherein said adhesive fluid contains a plurality of beads, said inlet valve being formed of a valve member and a valve seat, said valve and valve seat being constructed of a material having sufficient strength to resist damage from said beads upon contact between said valve member and said seat.

6. The metering device as set forth in claim 1, said displacement member being constructed of a first tubular member having an inlet at a first end and an outlet at a second end and extending along a major axis and a second tubular member having an outlet at a first end and a cap at a second end, said second tubular member being arranged in surrounding relationship with said first tubular member and defining a gap between the outer surface of said first tubular member and the inner surface of said second tubular member, said first tubular member and said second tubular member being adapted to allow flow of a cooling fluid in through said inlet of said first tubular member and out through said outlet of said first tubular member and subsequently through said gap and out through said outlet of said second tubular member.

7. A metering device for dispensing first and second adhesive fluids, at least one of the adhesive fluids having a plurality of non-compressible beads mixed therein, said metering device comprising:
   a first mechanism for dispensing the first fluid, said first mechanism including:

a) a first housing defining a first metering chamber with a first outlet therefrom, said first chamber receiving said first fluid therein;

b) a first displacement member slidably mounted in the first chamber to displace the first fluid therefrom and out of said first outlet;

c) first heat transfer means for cooling the first displacement member to prevent said first fluid from prematurely hardening; and a second mechanism for dispensing the second fluid, said second mechanism including:

d) a second housing defining a second metering chamber with a second outlet therefrom, said second chamber receiving said second fluid therein;

e) a second displacement member slidably mounted in the second chamber to displace the second fluid therefrom and out of said second outlet;

f) second heat transfer means for cooling the second displacement member to prevent said second fluid from prematurely hardening; and said second outlet for dispensing said second fluid being located substantially adjacent to said first outlet for dispensing said first fluid.

8. The metering device as set forth in claim 7, wherein said first and second displacement members have substantially equivalent rates of insertion into said first and second chambers, said first and second displacement members each having constant cross-sections, such that the volume flow ratio of said first to said second fluid through said first and second outlets, respectively, is substantially equivalent to the cross-sectional area ratio of said first displacement member to said second displacement member.

9. The metering device as set forth in claim 8, wherein each said first and second housing has a first and second end, first and second inlets being located proximate to said first ends, said first and second outlets being located proximate to said second ends, and means for periodically flushing said first and second fluids from their respective chambers between displacement cycles of said device.

10. The metering device as set forth in claim 7, said first and second displacement members each having a major axis and being formed with a recess extending along said major axis, said recess allowing flow of a cooling fluid within said displacement members so as to cool said first and second displacement members.

11. The metering device as set forth in claim 10, said first and second displacement member being constructed of a first and second inner tubular member having an inlet at a first end and an outlet at a second end and extending along a major axis and a first and second outer tubular member each having an outlet at a first end and a cap at a second end, said first and second outer tubular member being arranged in surrounding relationship with said first and second inner tubular member and defining a gap between the outer surface of said inner tubular member and the inner surface of said outer tubular member, said inner and outer tubular members being adapted to allow flow of a cooling fluid in through said inlet of said inner tubular member and out through said outlet of said inner tubular member and subsequently through said gap and out through said outlet of said outer tubular member.

12. The metering device as set forth in claim 7, wherein said first adhesive fluid contains said plurality of beads, a first inlet valve being formed of a valve member and a valve seat, said valve and valve seat being constructed of a material having sufficient strength to resist damage from said beads upon contact between said valve member and said seat.

13. The metering device of claim 12, wherein the valve member and valve seat are constructed of tungsten carbide or hardened steel.

14. A method of dispensing a fluid adhesive containing a plurality of non-compressible beads, comprising the steps of:

a) filling a first chamber with said fluid;

b) forcing a first displacement rod having a constant cross-section into said chamber at an insertion rate, whereby said fluid is forced out of said chamber at a rate in proportion to the cross-sectional area of said displacement rod; and c) cooling said first displacement rod, whereby said fluid adhesive is substantially prevented from hardening and said insertion of said displacement rod is facilitated.

15. The method of claim 14, further comprising the steps of:

a) filling a second metering chamber with a second fluid;

b) forcing said first and second rods into said first and second metering chambers at the same insertion rate, whereby said first and second fluids are forced out said first and second chambers at a first and second volume flow rate, such that a ratio of said first to said second flow rate is equivalent to a ratio of the cross-sectional areas of said first and said second displacement members; and c) cooling said first and second displacement rods, whereby said first and second fluids are prevented from hardening, and said insertion of said first and second displacement rods is facilitated.

16. The method of claim 14, which further comprises the steps of controlling the flow of the fluid mixture through at least one valve having a valve member and a valve seat, said valve and valve seat being constructed of a material having sufficient strength to resist damage from said beads.

17. The method of claim 16 wherein said valve and valve seat are made of tungsten carbide or hardened steel.

* * * * *